No. 679,194. Patented July 23, 1901.
J. TIMMS.
DRAFT RIGGING FOR CARS.
(Application filed Mar. 22, 1901.)
(No Model.) 5 Sheets—Sheet 1.
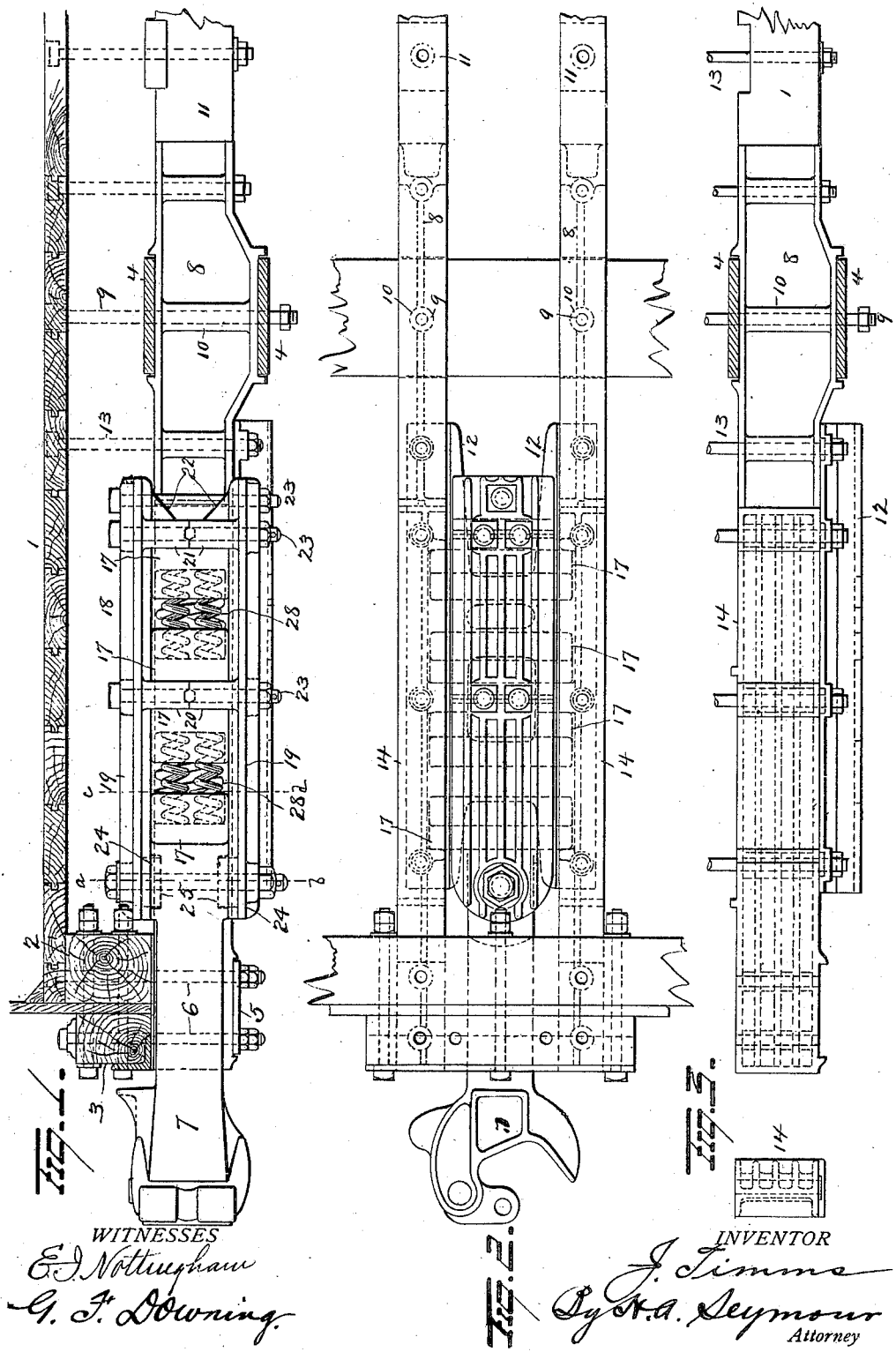
WITNESSES
INVENTOR No. 679,194. Patented July 23, 1901.
J. TIMMS.
DRAFT RIGGING FOR CARS.
(Application filed Mar. 22, 1901.)
(No Model.) 5 Sheets—Sheet 2.
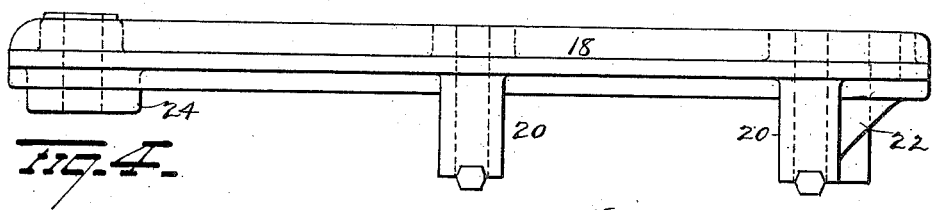
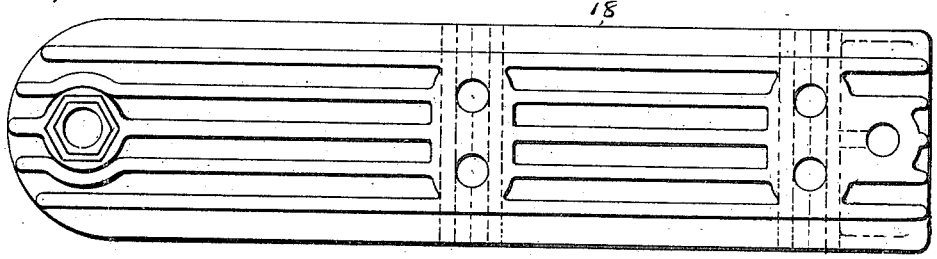
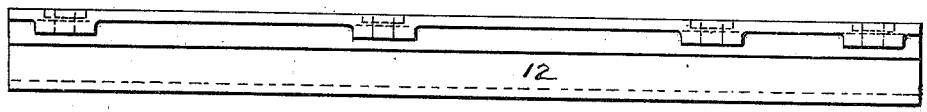
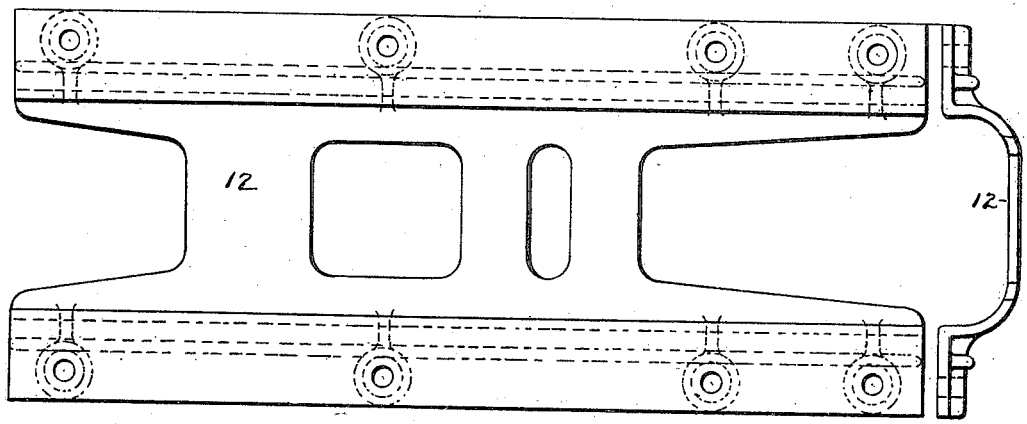
WITNESSES
E. J. Nottingham
G. F. Downing
INVENTOR
J. Timms
By H. A. Seymour
Attorney No. 679,194. Patented July 23, 1901.
J. TIMMS.
DRAFT RIGGING FOR CARS.
(Application filed Mar. 22, 1901.)
(No Model.) 5 Sheets—Sheet 3.
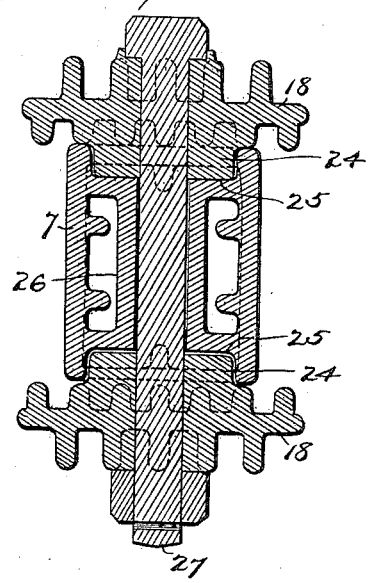
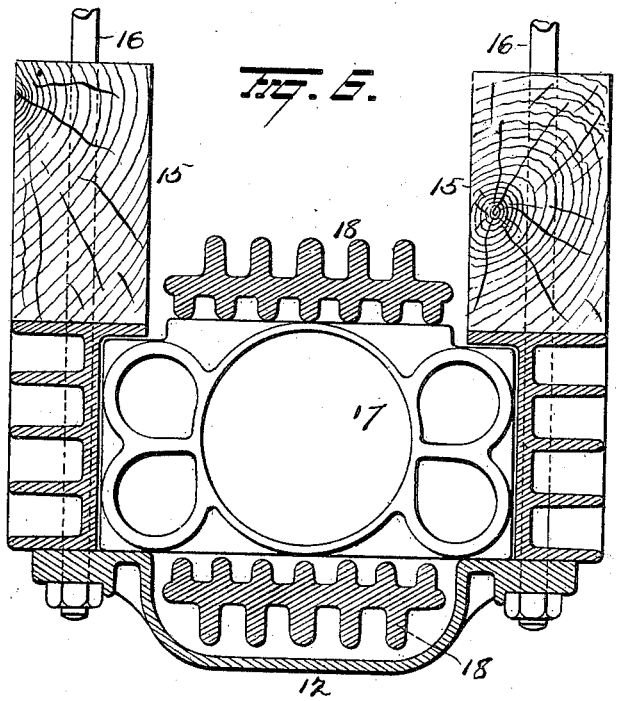
WITNESSES
E. J. Nottingham
G. F. Downing
INVENTOR
J. Timms
By H. A. Seymour
Attorney

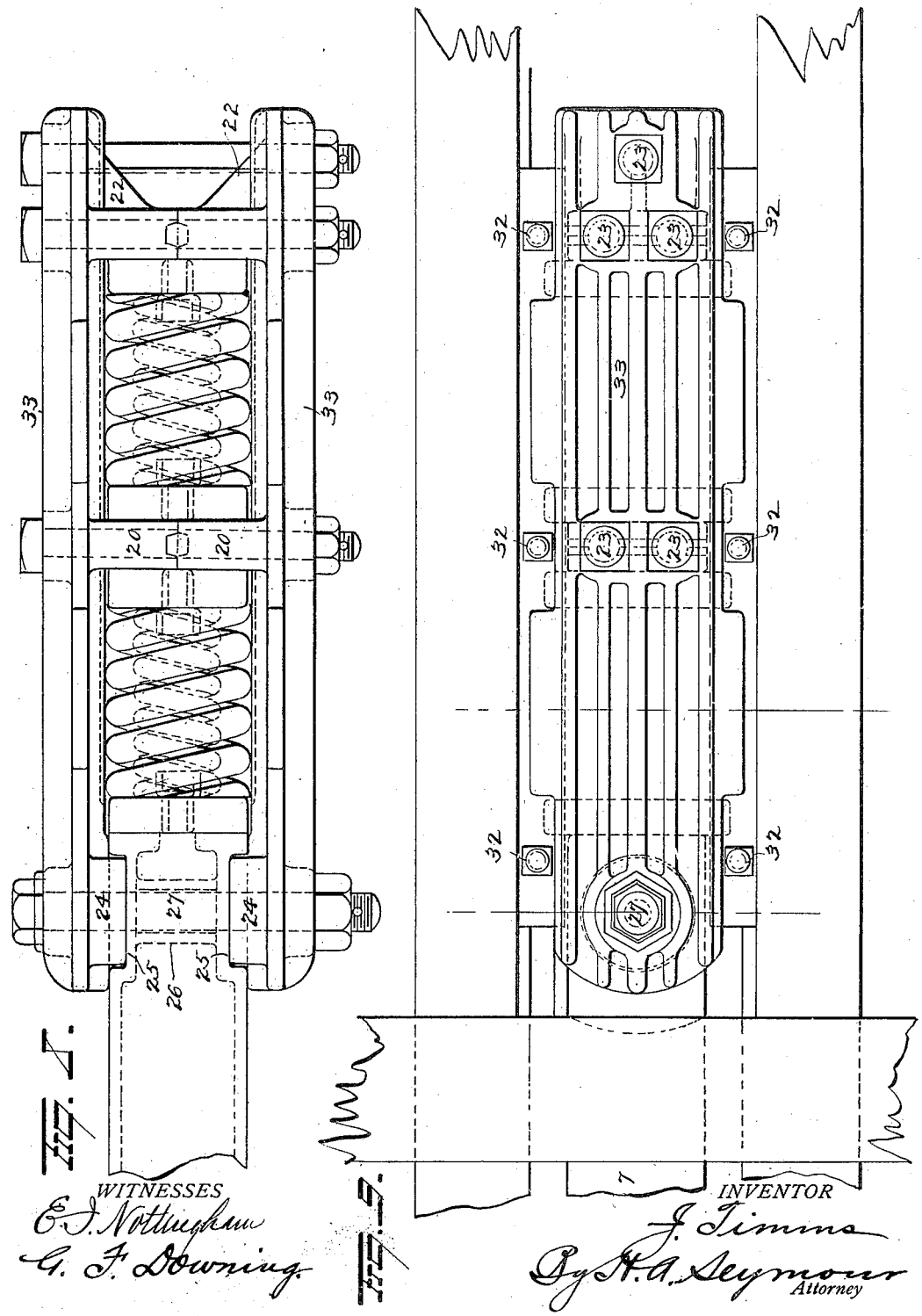

No. 679,194. Patented July 23, 1901.
J. TIMMS.
DRAFT RIGGING FOR CARS.
(Application filed Mar. 22, 1901.)
(No Model.) 5 Sheets—Sheet 5.

WITNESSES
E. J. Nottingham
G. F. Downing

INVENTOR
J. Timms
By H. A. Seymour
Attorney

UNITED STATES PATENT OFFICE.

JAMES TIMMS, OF COLUMBUS, OHIO, ASSIGNOR TO THE BUCKEYE MALLEABLE IRON AND COUPLER COMPANY, OF SAME PLACE.

DRAFT-RIGGING FOR CARS.

SPECIFICATION forming part of Letters Patent No. 679,194, dated July 23, 1901.

Application filed March 22, 1901. Serial No. 52,352. (No model.)

*To all whom it may concern:*

Be it known that I, JAMES TIMMS, a resident of Columbus, in the county of Franklin and State of Ohio, have invented certain new and useful Improvements in Draft-Rigging for Cars; and I do hereby declare the following to be a full, clear, and exact description of the invention, such as will enable others skilled in the art to which it appertains to make and use the same.

My invention relates to an improved draft-rigging for cars, one object of the invention being to provide an improved rigging which will permit of the ready removal of the coupling when desired and permit of slight pivotal movement of the coupling when secured to the rigging.

A further object is to provide an improved yoke for connecting the coupling and draft-irons.

A further object is to provide an improved draft-rigging which will be strong and durable and at the same time simple in construction and easy to mount upon a car.

With these objects in view the invention consists in certain novel features of construction and combinations and arrangements of parts, as will be more fully hereinafter described, and pointed out in the claims.

Figure 10:
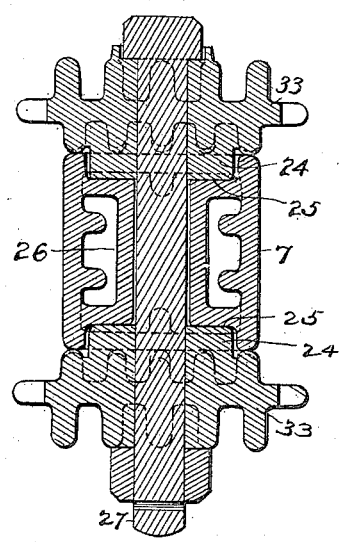
Figure 11:
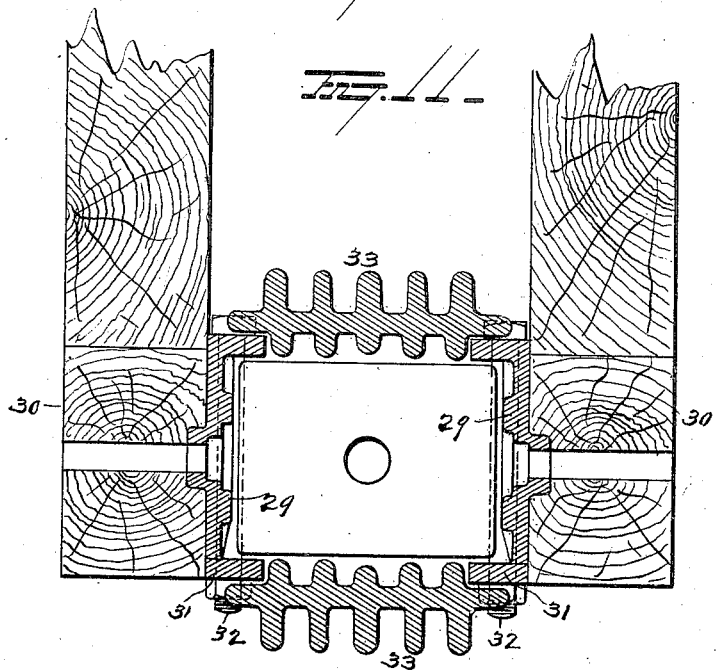

In the accompanying drawings, Figure 1 is a side view illustrating my improvements. Fig. 2 is a top view. Fig. 3 is a view illustrating the connecting-irons between the draw-bars and car-timbers. Fig. 4 is a view illustrating one-half of the follower-yoke. Fig. 5 is a view in section on the line *a b* of Fig. 1. Fig. 6 is a view in section on the line *c d* of Fig. 1, showing the springs removed. Fig. 7 is a detail view of the bottom tie-plate, and Figs. 8, 9, 10, and 11 are views illustrating my improvements modified for use in connection with wooden draft-timbers.

1 represents the floor of a car, 2 the sill, 3 the buffing-block, and 4 the body-bolster, all of the ordinary construction. To the sill 2 and buffing-block 3 a plate 5 is secured by bolts 6 and assists in supporting the coupling 7, as shown. Between the upper and lower members of the body-bolster 4 parallel angle-iron bars 8 are secured by bolts 9 passing through alined holes in the bolster 4 and through integral sleeves 10 on the bars 8, and the inner ends of the bars 8 are mortised to receive tenons on the ends of the timbers 11. The outer ends of the bars 8 are secured to a curved horizontally-disposed tie-plate 12 by bolts 13, and said plate is secured to draft-irons 14 and the latter to the under face of the car-timbers 15 by bolts 16. The draft-irons 14 are preferably ribbed on their outer faces and made with pockets to receive the ends of transversely-located follower-plates 17, mounted in a yoke 18, which will now be described.

The yoke 18 comprises upper and lower ribbed plates 19, made on their adjacent faces, near the longitudinal center thereof, with parallel lugs 20, having bolt-holes therein alining with holes in the plates 19, and lugs 21 are provided on the adjacent faces of plates 19 at their inner ends and are similar in all respects to lugs 20, save that strengthening-ribs 22 connect the lugs 21 and plates 19 to strengthen the yoke. The lugs 20 and 21 on the respective plates 19 are made with double mortise-and-tenon connection with each other, and bolts 23 are passed through the lugs 20 and 21 and through the rear ends of the members of the yoke to hold them securely together.

Circular enlargements 24 are provided on the adjacent faces of the plates 19 at their forward ends and the coupling 7 is made on its opposite faces with circular sockets or recesses 25 to receive the enlargements 24, and said plates 19 and enlargements 24 are made with bolt-holes and the coupling with an integral sleeve 26 to receive a bolt 27 to secure the yoke to the coupling, but permit of slight pivotal movement thereof and prevent any damage from lateral strain on the coupling, which in all constructions of similar character heretofore known has resulted in serious damage thereto owing to the rigid connection between the coupling and the draft-rigging.

The follower-plates 17 are located between the inner end of the coupling and the lugs 20 and between the latter and the lugs 21 and are supported at their ends in the pockets in the draft-irons 14 and have interposed between them springs 28 to hold the follower-plates against the yoke and cushion both the inward and outward strain on the rigging.

When my improved rigging is employed on a car having wooden draft-timbers, I slightly modify the construction, as shown in Figs. 8, 9, 10, and 11. In this form of my invention plates 29 are secured to the sides of the timbers 30 and are provided in their adjacent faces with pockets to receive the ends of the follower-plates, which latter are held in the pockets by strips 31, secured to the plates by bolts 32, as shown, which permit of their easy removal and the removal of the follower-plates when desired. If desired, the tie-plate 12 may be used in place of the strips 31.

The plates 33, forming the yoke in this construction, are preferably enlarged on opposite side edges to rest against the plates 31, and the bolts 32 limit the movement of the yoke by serving as stops against which the enlargements on plates 31 abut.

By constructing the yoke as above described I am enabled to greatly strengthen the rigging and to facilitate the connection and disconnection of the coupling, at the same time greatly strengthening the connection and lessening the liability of damage to the rigging and more especially to the yoke by the lateral strains which prove so damaging to all riggings heretofore known.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A yoke for connecting the draft irons or timbers of a car with a coupling, comprising parallel plates provided on their inner faces near one end with circular enlargements having their peripheral walls at right angles to the plates, and spacing devices extending from one plate to the other and secured to both.

2. A yoke for connecting the draft irons or timbers of a car with a coupling, comprising two parallel plates provided at one end with means for the attachment of the coupling, integral lugs projecting from the respective plates intermediate of the extremities thereof, the lugs on one plate engaging the lugs on the other plate and bolts passing through said plates and lugs.

3. A yoke for connecting the draft irons or timbers of a car and coupling comprising two parallel plates, intermeshing lugs on the adjacent faces of the plates, bolts passing through said lugs and plates and securing them together and means at one end of the plates for the attachment of the coupling.

4. A yoke for connecting the coupling and draft irons or timbers of a rigging, comprising two parallel plates, lugs on the adjacent faces of the plates having mortise-and-tenon connection with each other, bolts passed through said plates and lugs to secure them together, and circular enlargements on the adjacent faces of the plates at one end to fit into correspondingly-shaped recesses in a coupling and constitute a pivotal connection for the coupling to the yoke.

5. In a draft-rigging, the combination with draft irons or timbers and a coupling, of a yoke having integral enlargements provided with circular walls disposed at right angles to the plates and entering similarly-shaped sockets in the coupling and pivotally connecting the coupling with the yoke, spacing devices between the ends of said yoke, and extending from one plate to the other of said yoke, follower-plates and springs arranged in tandem between the lugs and coupling and between the lugs and inner end of the yoke and said draft irons or timbers having pockets therein to receive the ends of the follower-plates.

6. In a draft-rigging for cars, the combination with a coupling, body-transom, draft-irons and a tie-plate secured to the draft-irons, of independent angle-iron bars secured between the members of said transom and connected at one end to the timbers of the car, and at the other end to the tie-plate, and a yoke elastically supported between said draft-irons and secured to the coupling.

7. In a draft-rigging for cars, the combination with a body-transom, draft-irons, and a tie-plate secured to the draft-irons, of independent angle-iron bars secured between the members of the body-transom, said angle-iron bars being connected with the tie-plate to said draft-irons.

8. A yoke for connecting the draft irons or timbers of a car and coupling, comprising two ribbed plates, integral lugs on the adjacent faces of the plates between the ends thereof having mortise-and-tenon connection with each other, similar lugs at the inner ends of said plates and circular enlargements on the adjacent faces of the plates at their outer ends to fit into correspondingly-shaped recesses in a coupling.

9. In a draft-rigging for cars, the combination with a body-transom, draft-irons and a tie-plate secured to the draft-irons, of angle-iron bars secured at one end to said tie-plate and extending at their other ends between the members of the transom and projecting rearwardly beyond the same, the rear ends of said angle-iron bars having pockets for the reception of the ends of the subsills of the car.

In testimony whereof I have signed this specification in the presence of two subscribing witnesses.

JAMES TIMMS.

Witnesses:
S. W. FOSTER.
A. W. BRIGHT.